(12) United States Patent
Perinet et al.

(10) Patent No.: US 7,621,178 B2
(45) Date of Patent: Nov. 24, 2009

(54) METHOD AND APPARATUS FOR DETERMINING THE VOLUME OF FUEL IN A VEHICLE FUEL TANK

(75) Inventors: Jean-Francois Perinet, Fresnois-la-Montagne (FR); Michel Sanchez, Tellancourt (FR)

(73) Assignee: Delphi Technologies, Inc., Troy, MI (US)

( * ) Notice: Subject to any disclaimer, the term of this patent is extended or adjusted under 35 U.S.C. 154(b) by 312 days.

(21) Appl. No.: 11/508,548

(22) Filed: Aug. 23, 2006

(65) Prior Publication Data

US 2007/0051172 A1 Mar. 8, 2007

(30) Foreign Application Priority Data

Sep. 2, 2005 (GB) ................................. 0517892.6

(51) Int. Cl.
*G01F 17/00* (2006.01)

(52) U.S. Cl. ...................................................... 73/149
(58) Field of Classification Search .................... 73/149
See application file for complete search history.

(56) References Cited

U.S. PATENT DOCUMENTS 2,849,881 A * 9/1958 Anderson .................. 73/290 B
4,984,457 A * 1/1991 Morris ......................... 73/149

* cited by examiner

*Primary Examiner*—Hezron Williams
*Assistant Examiner*—Rodney T Frank
(74) *Attorney, Agent, or Firm*—Patrick M. Griffin

(57) ABSTRACT

A method of determining the volume of fuel in a vehicle fuel tank comprising the steps of determining the volume of vapor/air in the fuel tank and calculating the volume of fuel in the tank based upon the determined volume of vapor/air. The volume of vapor/air is determined by the steps of closing the fuel tank, pumping air into or out of the closed volume of the fuel tank and measuring the change in pressure in the fuel tank as a function of time during said pumping to determine the volume of vapor/air in the tank.

2 Claims, 1 Drawing Sheet

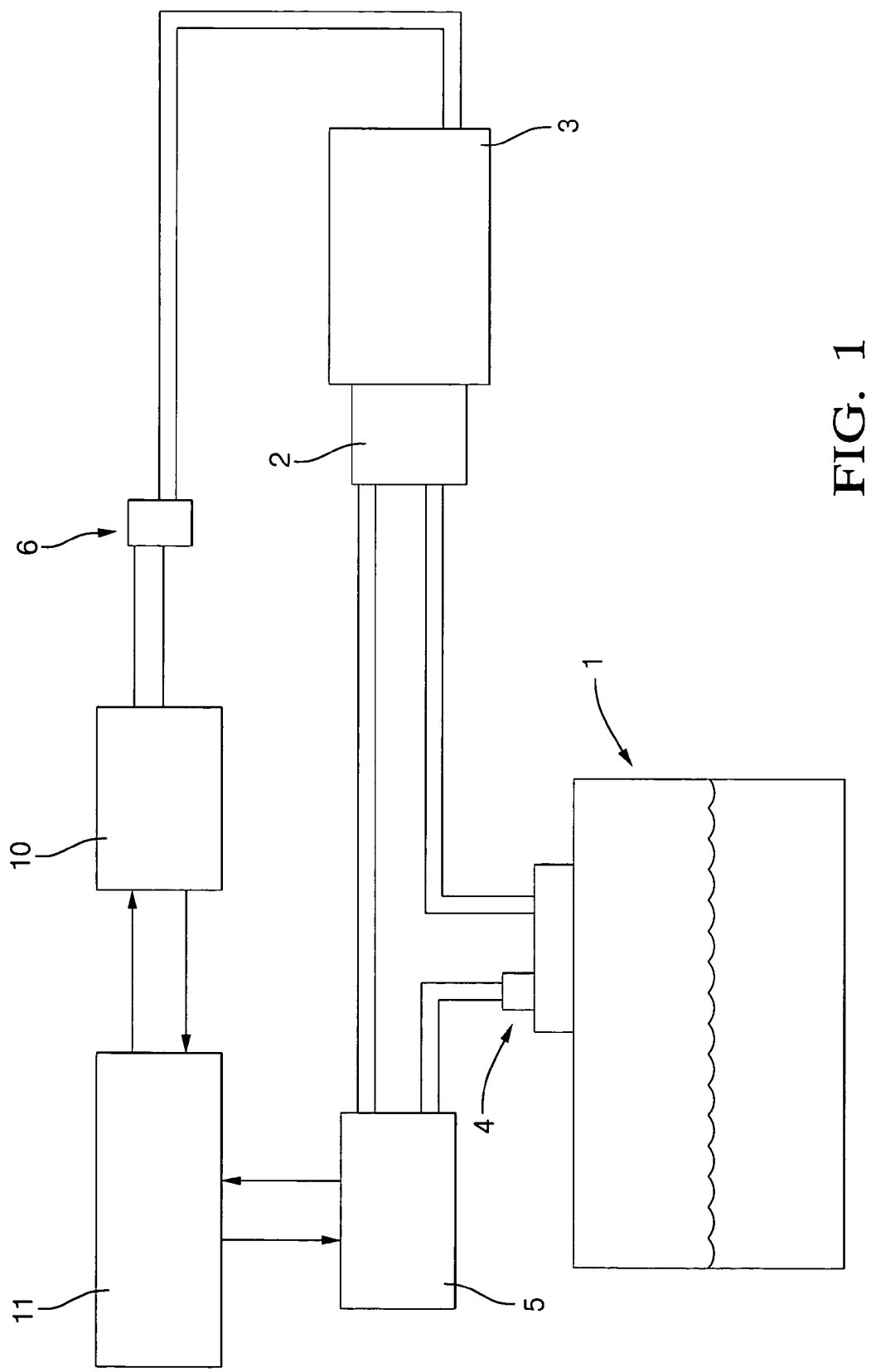

METHOD AND APPARATUS FOR DETERMINING THE VOLUME OF FUEL IN A VEHICLE FUEL TANK

TECHNICAL FIELD OF INVENTION

The present invention relates to a method and apparatus for determining the volume of fuel in a fuel tank, and in particular to a fuel volume sensor for determining the volume of fuel in a motor vehicle fuel tank.

BACKGROUND OF INVENTION

The most common way of measuring the volume of fuel in a fuel tank of a motor vehicle consists in using a variable printed resistor card associated with a floating arm inside the fuel tank. The main disadvantage of this technology is sensitivity to contamination and chemical attack. Recent evolutions in fuels (lower sulphur rates), have forced manufacturers to use noble metal on the resistor cards (Pd, Pt and Gold instead of Silver/Ni). Other technologies can overcome these difficulties, so-called contact-less (ultrasonic, capacitive, magnetic, inductive) sensors, but these all require the sensor to be immersed in the fuel in the fuel tank.

The aim of the present invention is to overcome the above-mentioned problems.

SUMMARY OF THE INVENTION

According to the present invention there is provided a method of determining the volume of fuel in a vehicle fuel tank comprising the steps of determining the volume of vapour/air in the fuel tank and calculating the volume of fuel in the tank based upon the determined volume of vapour/air.

Preferably the volume of vapour/air is determined by the steps of closing the fuel tank, pumping air into or out of the closed volume of the fuel tank and measuring the change in pressure in the fuel tank as a function of time during said pumping to determine the volume of vapour/air in the tank. Preferably the step of closing the tank comprises closing a valve provided in a vent or purge outlet in the tank.

Preferably the method includes the further step of detecting if the fuel tank is at equilibrium conditions (i.e. fuel vapour pressure in the fuel tank is at a steady state) and only determining the volume of fuel in the fuel tank when equilibrium conditions are detected. Preferably equilibrium conditions are detected by closing the fuel tank and recording any change of vapour pressure over time indicative of non-equilibrium conditions (i.e. increasing fuel vapour pressure such as after refuelling or during rapid changes in fuel temperature), before or without pumping air into or out of the tank.

According to a further aspect, the present provides means for determining the volume of fuel in a vehicle fuel tank comprising valve means for selectively closing a fuel tank vent or purge outlet, pump means for pumping air into or out of the fuel tank, pressure sensing means for sensing the pressure within the fuel tank and control means for controlling the operation of the air pump and for receiving pressure measurements from the pressure sensing means and for determining the volume of vapour/air in the fuel tank based upon the pressure measurements and calculating the volume of fuel based upon the determined vapour/air volume.

Preferably the control means further comprises means for detecting when the fuel tank is under equilibrium conditions and only determining the volume of fuel in the fuel tank when equilibrium conditions are detected.

The pumping means may comprise an air pump (which may already been in place for on-board diagnostic (OBD) leak detection). The pressure sensing means may comprise a fuel tank vapour pressure sensor (which may already be in place for the OBD leak detection).

Where an OBD system is in place, a purge valve may be used be closing the fuel tank at the start of the operation of volume of fuel sensing, and for opening the fuel tank a the end of volume of fuel sensing.

The principle of the present invention consists in evaluating the vapour dome volume by closing the fuel tank (through the purge valve, if present), running the air pump for a predetermined time and taking vapour pressure measurements and determining the volume of fuel based on the change in pressure measurements over time. The air pump may be turned off after a predetermined time period (i.e. after a predetermined volume of air has been added to or removed from the fuel tank) or when a predetermined pressure has been reached.

The main advantages of the present invention are the positioning of the sensor outside of the fuel tank (reducing serviceability constraints and costs), the use of a motionless and contactless sensor without contact with the fuels (improving reliability), and the possible use of components already installed on the motor vehicle.

The fuel volume determining means and method of the present invention may cooperate with an existing onboard computer for calibrating the onboard computer for remaining fuel volume in the fuel tank. The onboard computer may be utilised to determine the volume of fuel (based upon the fuel consumption the engine determined by the onboard computer) when the volume of fuel determining means cannot be used due to the fuel vapour in the fuel tank not being at equilibrium conditions. Thus, the fuel volume determining means may further comprise means for determining the fuel consumption of the vehicle engine, the control means calculating the fuel volume based upon the determined fuel consumption and the fuel volume calculated during the most recently detected equilibrium conditions.

Further features and advantages of the invention will appear more clearly on a reading of the following detail description of the preferred embodiment of the invention, which is given by way of non-limiting example only and with reference to the accompanying drawings.

BRIEF DESCRIPTION OF DRAWINGS

This invention will be further described with reference to the accompanying drawing in which FIG. 1 is a schematic view of a volume of fuel sensor in accordance with the present invention.

DETAILED DESCRIPTION OF INVENTION

The present invention will now be described, by way of example, with reference to the accompanying drawings, in which FIG. 1 is a schematic view of a volume of fuel sensor in accordance with the present invention.

The fuel level sensor in accordance with an embodiment of the present invention comprises an air pump 2 connectable to the interior of the fuel tank 1 between a vapour recovery carbon canister 3 and the fuel tank 1; a pressure sensor 4 mounted on the fuel tank 1 for monitoring the pressure of the vapour inside the fuel tank 1; and control means 5 (such as a controller and computer-based system) connected to the air pump 2 for controlling the operation of the air pump 2 and connected to the pressure sensor 4 for obtaining a measurement of the vapour pressure.

The operation of the fuel level sensor comprises the steps of closing the fuel tank by means of a purge valve 6; operating the air pump for a predetermined period of time and measuring the increase in vapour pressure ($\Delta P$); turning the air pump off and determining the vapour volume based on the increase in vapour pressure $\Delta P$ as a function of time; and determining the volume of fuel based on the determined vapour volume. Alternatively the air pump may be operated until a predetermined vapour pressure is reached and the vapour volume calculated based upon the time taken to reach such predetermined volume. The vapour volume may be determined by the use of look up tables containing data corresponding to pressure change over time for predetermined fuel volumes for a given fuel tank.

In the embodiment shown in FIG. 1, the fuel level sensor is preferably integrated with an on-board diagnostics (OBD) system for leak detection, which is associated with the fuel vapour purge system for the fuel tank. The ODB system includes the air pump 2, the pressure sensor 4, and the purge valve 6 which is connected to the fuel tank 1. The purge valve 6 is closed at the start of the operation of the fuel level sensor (before the air pump is operated) to close the vent outlet of the fuel tank, and opened at the end of the operation (after the air pump is turned off).

In order to detect whether or not the fuel vapour in the fuel tank is at an equilibrium condition to ensure reliable operation of the level sensing means, the vapour pressure can be measured for a predetermined period after closing the fuel tank and before operating the air pump. An increase in vapour pressure during such period beyond a predetermined level can be used to indicate non-equilibrium condition.

When such non-equilibrium condition is detected, the volume of fuel determining operation can be suspended until an equilibrium condition is once again detected.

During such non-equilibrium condition, the volume of fuel can be determined by calculating the remaining fuel volume in the tank based upon the fuel consumption of the engine determined by an onboard computer 10, connected to the control means 5 via a data bus 11. Once equilibrium conditions are once again determined, the fuel level sensing means can be used to calibrate the fuel volume calculated by the onboard computer.

Various modifications and variations to the described embodiment of the invention will be apparent to those skilled in the art without departing from the scope of the invention as defined in the appended claims. Although the invention has been described in connection with a specific preferred embodiment, it should be understood that the invention as claimed should not be unduly limited to such specific embodiment.

While this invention has been described in terms of the preferred embodiments thereof, it is not intended to be so limited, but rather only to the extent set forth in the claims that follow.

We claim:

1. A method of determining the volume of fuel in a vehicle fuel tank comprising the steps of
   providing means for detecting whether the fuel tank is under equilibrium conditions:
   detecting whether the fuel tank is at equilibrium conditions;
   if the fuel tank is at equilibrium conditions, the method further comprises the steps of closing the fuel tank, pumping air into or out of the closed volume of the fuel tank and measuring the change in pressure in the fuel tank as a function of time during said pumping to determine the volume of vapour/air in the fuel tank, and calculating the volume of fuel in the tank based upon the determined volume of vapour/air; and
   if the fuel tank is not at equilibrium conditions, the method further comprises the steps of determining the fuel consumption of the vehicle engine, and calculating the fuel volume based upon the determined fuel consumption and the fuel volume calculated during the most recently detected equilibrium conditions.

2. A method of determining the volume of fuel in a vehicle fuel tank in claim 1, wherein said means for detecting whether the fuel tank is under equilibrium conditions includes an OBD system having an air pump, a pressure sensor, and a purge valve, wherein said purge valve is attached to said tank.

\* \* \* \* \*